US010731336B2

(12) United States Patent
Mauer et al.

(10) Patent No.: US 10,731,336 B2
(45) Date of Patent: Aug. 4, 2020

(54) METHOD AND APPARATUS FOR PRODUCING THREE-DIMENSIONAL TOPOGRAPHIC ACOUSTIC PANELS

(71) Applicant: MTRL Design, Omaha, NE (US)

(72) Inventors: Nicholas Mauer, Omaha, NE (US); Joshua Powell, Omaha, NE (US); Christopher Prinz, Omaha, NE (US)

(73) Assignee: MTRL Design, Omaha, NE (US)

( * ) Notice: Subject to any disclaimer, the term of this patent is extended or adjusted under 35 U.S.C. 154(b) by 391 days.

(21) Appl. No.: 15/862,808

(22) Filed: Jan. 5, 2018

(65) Prior Publication Data

US 2018/0195273 A1  Jul. 12, 2018

Related U.S. Application Data

(60) Provisional application No. 62/443,183, filed on Jan. 6, 2017.

(51) Int. Cl.
E04B 1/84 (2006.01)
E04B 1/82 (2006.01)
(Continued)

(52) U.S. Cl.
CPC .............. E04B 1/84 (2013.01); E04B 1/8218 (2013.01); E04B 1/86 (2013.01); E04C 2/326 (2013.01);
(Continued)

(58) Field of Classification Search
CPC ..... E04B 1/84; E04B 1/86; E04B 1/99; E04B 2001/8461; E04B 2001/8414; E04B 2001/8218; G06F 30/13; G10K 11/16
See application file for complete search history.

(56) References Cited

U.S. PATENT DOCUMENTS 6,459,952 B1  10/2002 Dundorf
7,216,003 B2   5/2007 Faulkner et al.
(Continued)

FOREIGN PATENT DOCUMENTS

CN  101138926 A    3/2008
FR    2991090 B1   4/2015
KR  101220584 B1   1/2013

OTHER PUBLICATIONS

A.M. Acoustics, "3D Figure Cut Sound Absorber", Apr. 18, 2018, 8 pgs, http://www.amacoustics.com/products/3d-figure-cut-sound-absorber.

(Continued)

Primary Examiner — Forrest M Phillips
(74) Attorney, Agent, or Firm — Milligan PC LLO

(57) ABSTRACT

The present invention provides product, method and apparatus for designing and constructing three-dimensional models for use as acoustic panels. A preferred embodiment of the present invention provides a method and apparatus for designing and constructing three-dimensional models for use as acoustic panels. According to one aspect of the present invention, a method is provided which includes the steps of calculating dimensions and segments of a three-dimensional model based on detected acoustic properties of a room, characteristics of substrate materials, and dimensions of a selected substrate. According to a preferred embodiment, the material employed with the present invention may include materials such as cardboard, paper, acrylic, wood, and fabric. The final product of the present invention preferably has acoustic absorbing functions and may be hung on a wall or suspended in the middle of a room to provide noise reduction in an aesthetically appealing three-dimensional design.

15 Claims, 8 Drawing Sheets

(51) Int. Cl.
  *E04B 1/86*   (2006.01)
  *E04C 2/32*   (2006.01)
  *G06F 30/13*  (2020.01)
  *G06F 30/17*  (2020.01)
  *E04B 1/99*   (2006.01)
  *G10K 11/16*  (2006.01)
  *G06F 119/10* (2020.01)

(52) U.S. Cl.
  CPC .............. *G06F 30/13* (2020.01); *G06F 30/17* (2020.01); *E04B 1/99* (2013.01); *E04B 2001/8414* (2013.01); *E04B 2001/8461* (2013.01); *G06F 2119/10* (2020.01); *G10K 11/16* (2013.01)

(56) References Cited

U.S. PATENT DOCUMENTS

| | | |
|---|---|---|
| 7,291,364 B2 | 11/2007 | Faulkner et al. |
| 7,656,402 B2 | 2/2010 | Abraham et al. |
| 7,686,617 B2 | 3/2010 | Wcislo et al. |
| 2015/0134096 A1 | 5/2015 | Travers et al. |

OTHER PUBLICATIONS

Audimute, "Standard Image Panels for Highly Effective and Attractive Acoustic Treatment", Apr. 18, 2018, 3pgs, https://www.audimute.com/acoustic-art-panels/decorative-acoustic-panels-decorative-acoustic-wall-panels.

METHOD AND APPARATUS FOR PRODUCING THREE-DIMENSIONAL TOPOGRAPHIC ACOUSTIC PANELS

CROSS REFERENCE TO RELATED APPLICATIONS

This patent application claims priority to U.S. Provisional Application No. 62/443,183, filed on Jan. 6, 2017, which is entirely incorporated herein by reference.

FIELD OF INVENTION

The present invention is related in general to acoustic panels and, in particular, to a method for producing three-dimensional topographic designs for acoustic paneling.

BACKGROUND OF THE INVENTION

Acoustic paneling is well-known in the art and is widely used to dampen sound reverberations and to control noise levels in large rooms and spaces. However, the acoustic panels currently produced are generally unattractive and therefore not used in many spaces because the paneling detracts from the overall décor of most rooms.

To overcome the limitations of the prior art, the present invention provides a method and apparatus for creating interesting, affordable sound dampening products which provide aesthetically pleasing images with sound dampening characteristics.

SUMMARY OF THE DISCLOSURE

A preferred embodiment of the present invention provides a method and apparatus for designing and constructing three-dimensional models for use as acoustic panels. According to one aspect of the present invention, a method is provided which includes the steps of calculating dimensions and segments of a three-dimensional model based on detected acoustic properties of a room, characteristics of substrate materials, and dimensions of a selected substrate. According to a preferred embodiment, the material employed with the present invention may include materials such as cardboard, paper, acrylic, wood, and fabric. The final product of the present invention preferably has acoustic absorbing functions and may be hung on a wall or suspended in the middle of a room to provide noise reduction in an aesthetically appealing three-dimensional design.

According to a further preferred embodiment, the method of the present invention may preferably include the steps of: obtaining a three-dimensional design in a computer-readable format; inputting a room's dimensions and acoustic characteristics to determine the final dimensions of a three-dimensional model construct; calculating a range of product sizes and materials based on target acoustical characteristics; determining the number and dimensions of segments of a selected substrate required for the three-dimensional model construct; segmenting the three-dimensional model construct into slices corresponding to the number of sheets of substrate that will form the final product; laser cutting each segment of the selected substrate into sheets; and gluing the selected substrate sheets together to create a three-dimensional model construct.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION OF THE DRAWINGS

Figure 1:
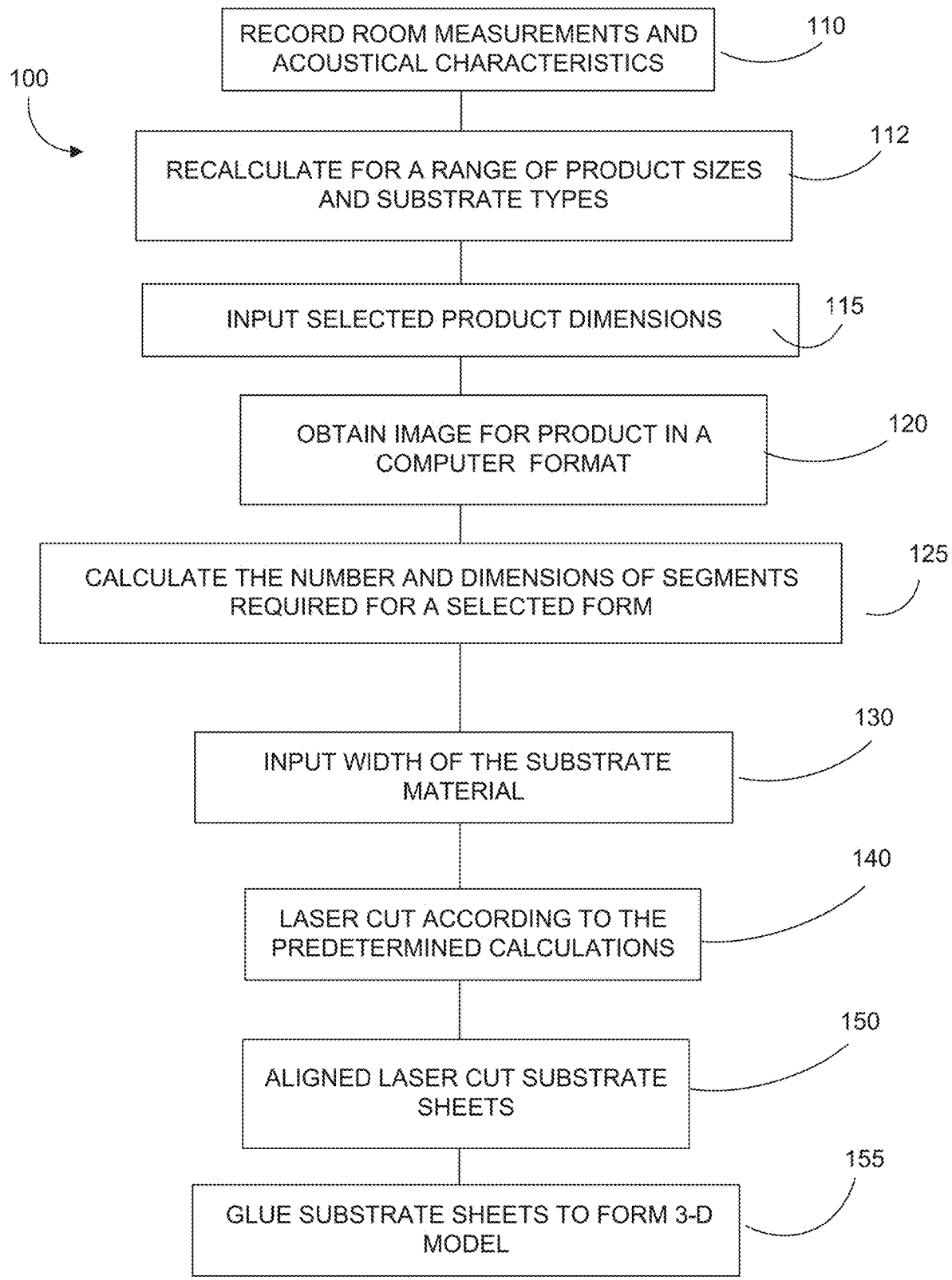
FIG. 1 shows a flow chart of a preferred method of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc, or any other appropriate computer-readable medium or storage device). In one embodiment, the computer-executable instructions may include lines of complied C++, Java, HTML, or any other programming or scripting code such as R, Python and/or Excel. Further, the present invention teaches the use of processors to perform the functionalities and processes described herein. As such, processor is understood to mean the computer chip or processing element that executes the computer code needed for the performance of a specific action.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

The terms "computer," "engine," "module," "processor" and the like should be understood to be synonymous for the purposes of this disclosure. Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Reference is now made in detail to the exemplary embodiments of the invention, examples of which are illustrated in the accompanying drawings. Wherever possible, the same reference numbers will be used throughout the drawings to refer to the same or like parts. It should be understood that throughout this disclosure, unless logically required to be otherwise, where a process or method is shown or described, the steps of the method may be performed in any order or simultaneously. As used throughout this application, the word "may" is used in a permissive sense (i.e., meaning "having the potential to'), rather than the mandatory sense (i.e. meaning "must").

With reference now to FIG. 1, a flow chart of a preferred method of the present invention will now be discussed. As shown in FIG. 1, an exemplary method 100 for creating and editing a three-dimensional model is provided which includes a first step 110 of recording room measurements and acoustical characteristics of a given space. According to a preferred embodiment, the acoustical characteristics may include characteristics such as reverberation time, clarity, background noise and the speech transmission index. In exemplary step 112, after the room dimensions and acoustical characteristics are measured for a given area, the present invention preferably calculates a range of adjusted acoustical characteristics for a range of potential product sizes and substrate types which could be used in the space. For example, a system in accordance with present invention may preferably calculate and display the altered acoustical characteristics of a given area based on a product having dimensions of 2'×4', 3'×5' and 7'×10' for a product which may be constructed of cardboard, acoustical foam, cardboard, paper, acrylic, wood, and fabric. Accordingly, a range of before and after acoustical characteristics may be provided so that a user may select the optimum product size and composition for a given area as shown in step 115.

As shown in step 120, along with the selection of the size and composition, the method of present invention may preferably include a step of selecting imagery for use in printing imagery or shading onto segments of the desired product.

Figure 3:
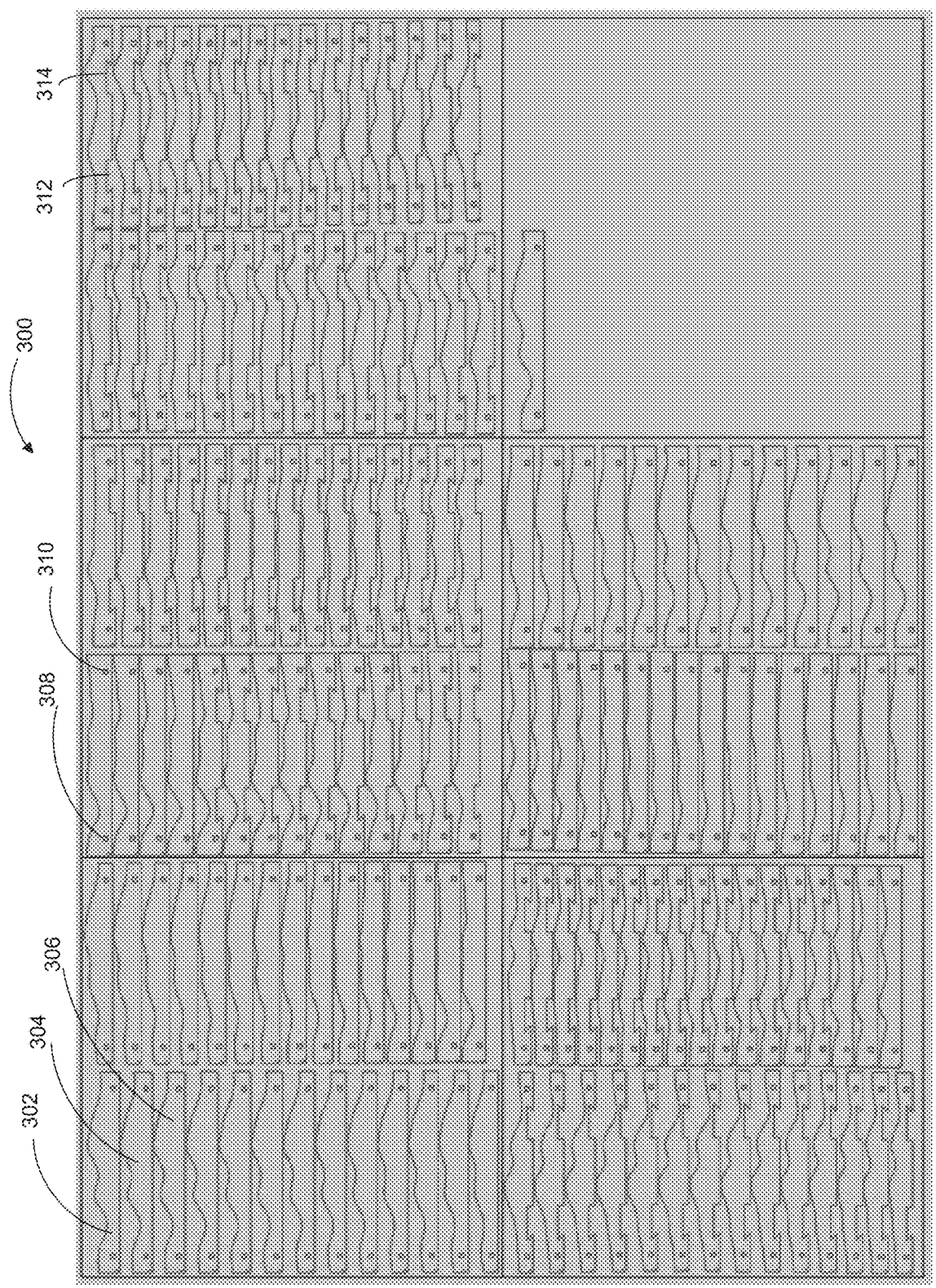
FIG. 3 shows exemplary individual segments created to be assembled to form an construct/image with three-dimensional features.

As step 125, once the form dimensions and substrate material are selected, the present invention preferably calculates the number and dimensions of segments required to produce a selected form. Preferably, the forms of the present invention may be produced from multiple segments of a selected material which may be individually cut and assembled to create a three-dimensional form. For example, as shown in FIG. 3, the selected dimensions and substrate materials (i.e. a 6'×8' cardboard form in a rectangular shape replicating a lunar landscape) in step 125 may be converted into a series of cardboard segments which are to be cut and assembled to create a single form.

In step 130, once the number and dimensions of segments are calculated, the dimensions of the selected substrate material to be used are preferably input into the system. In step 140, the system of the present invention preferably uses the input dimensions of the selected substrate material (i.e. 10'×10' cardboard sheets) to calculate and execute cuts for each piece of substrate material. Preferably, the needed cuts are made using a laser cutting machine or the like with the system calculating the positions of the needed cuts for each segment of each piece of substrate material input into the system. Preferably, the dimensions of the selected substrate material may be entered either individually (i.e. one measurement for each piece) or in groups for multiple selected substrate materials of the same size. According to a further preferred embodiment, the cut substrate material is preferably laser printed with a sheet number or ID indicating its order in the later assembled form. Further, the cut substrate preferably may be further printed with aligning points to assist with later assembly. For later assembly, these aligning points may be used as insertion points for wires to assist holding alignment as needed.

In step 150, the laser cut sheets are preferably arranged and aligned. In step 155, the aligned and arranged laser cut sheets are then preferably glued together to form a three-dimensional model. According to a preferred embodiment of the present invention, the alignment and arrangement of sheets may occur individually for each sheet with the step of gluing each sheet occurring individually before the next sheet is aligned and glued. Thereafter, the finally constructed three-dimensional model may then preferably be hung on a wall or suspended in the middle of a room to provide noise reduction.

Figure 2:
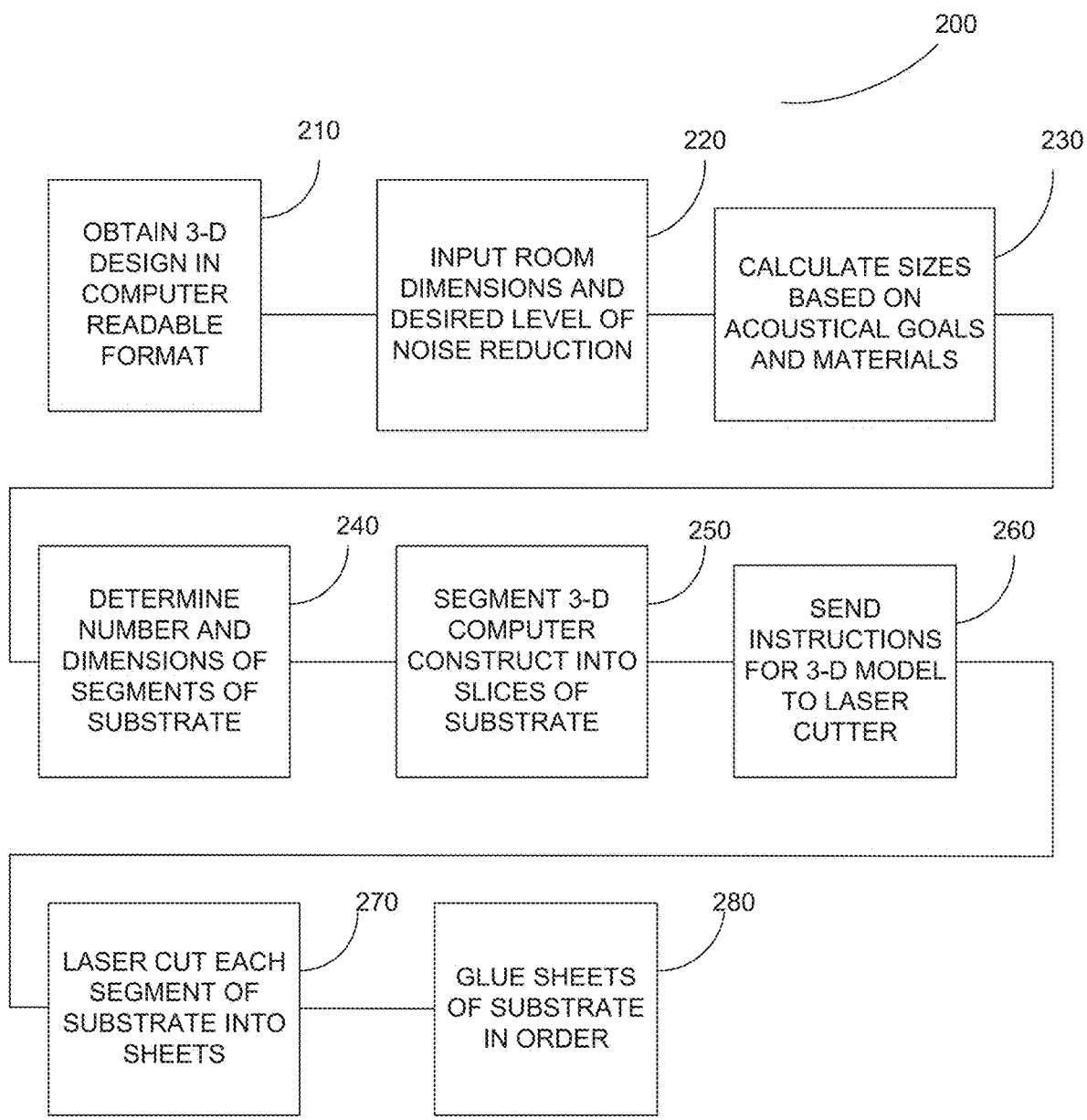
FIG. 2 shows flow chart of a method for creating and editing a three-dimensional model for providing dampening of vibrational reverberations.

With reference now to FIG. 2, a method for creating and editing a three-dimensional model for providing dampening of vibrational reverberations according to an alternative embodiment of the present invention will now be discussed. As shown in FIG. 2, according to an alternative embodiment, the present invention may be used to create three-dimensional noise reducing models without inputting recorded noise characteristics for a given space.

As shown in step 210, the method of creating a model may begin with the selection of a 2-D or 3-D design or image. Preferably, the selected design or image may be captured as an image and rendered using CAD input software or the like. At step 220, a user may input room dimension for the expected location of the model and an indication of how much noise reduction is desired. According to a preferred embodiment, the user may select a level of noise reduction desired either by indicating an exact decibel reduction (i.e. 10 dB) or an approximate level of reduction (i.e. high, medium or low) Which the system may use to assign a target level of reduction.

At step 230, the system may then calculate an optimum size and type of material for the indicated room size and noise reduction goal. In step 240, the system may then preferably select or receive the dimensions of the input material and calculate the number and dimensions of the segments needed for the desired model size. At step 250, the system may then preferably create instructions for the needed cuts to each segment of input material. In step 260, the system may then preferably provide the calculated cutting instructions to a laser cutter or similar cutting device. In step 270, the laser cutter may preferably execute cuts for each piece of substrate material according to the received instructions. According to a further preferred embodiment, the cut substrate material may preferably be laser printed with a sheet number or ID indicating its order in the later assembled form. Further, the cut substrate preferably may be further printed with aligning points to assist with later assembly. For later assembly, these aligning points may be used as insertion points for wires to assist with holding alignment as needed.

In step 280, the laser cut sheets are preferably arranged, aligned and then preferably glued together to form a three-dimensional model. According to a preferred embodiment of the present invention, the alignment and arrangement of sheets may occur individually for each sheet with the step of gluing each sheet occurring individually before the next sheet is aligned and glued.

FIG. 3 provides a view 300 of exemplary individual cut sheets 302, 304 and 306 which are created to be assembled to form an image with three-dimensional features. As shown, the individual cut sheets 302, 304, 306 may preferably be formed from cardboard or other sound absorbing material which may be cut and laterally assembled to form three-dimensional models and features. As shown, the individual cut sheets 302, 304, 306 each may preferably be formed with alignment holes or points 308, 310 to assist with later alignment and mounting as discussed below. Further, selected portions of selected sheets may preferably include mounting grooves 312, 314 which are cut into bottom surfaces of the sheets. These mounting grooves 312, 314 may preferably be formed and located to mate with mounting guides as discussed further below.

Figure 4:
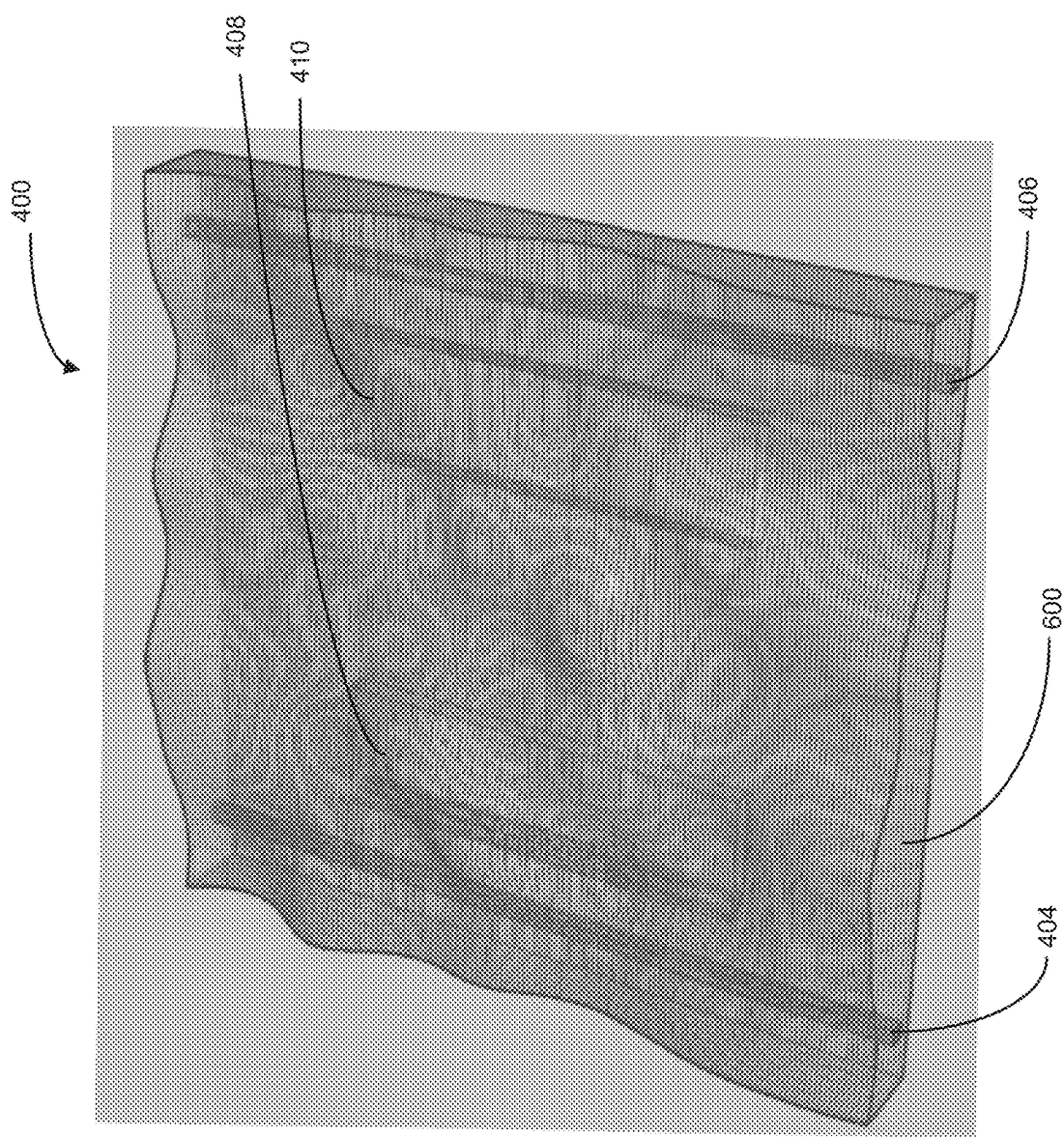
FIG. 4 shows an exemplary three-dimensional construct formed from assembled segments.
Figure 5:
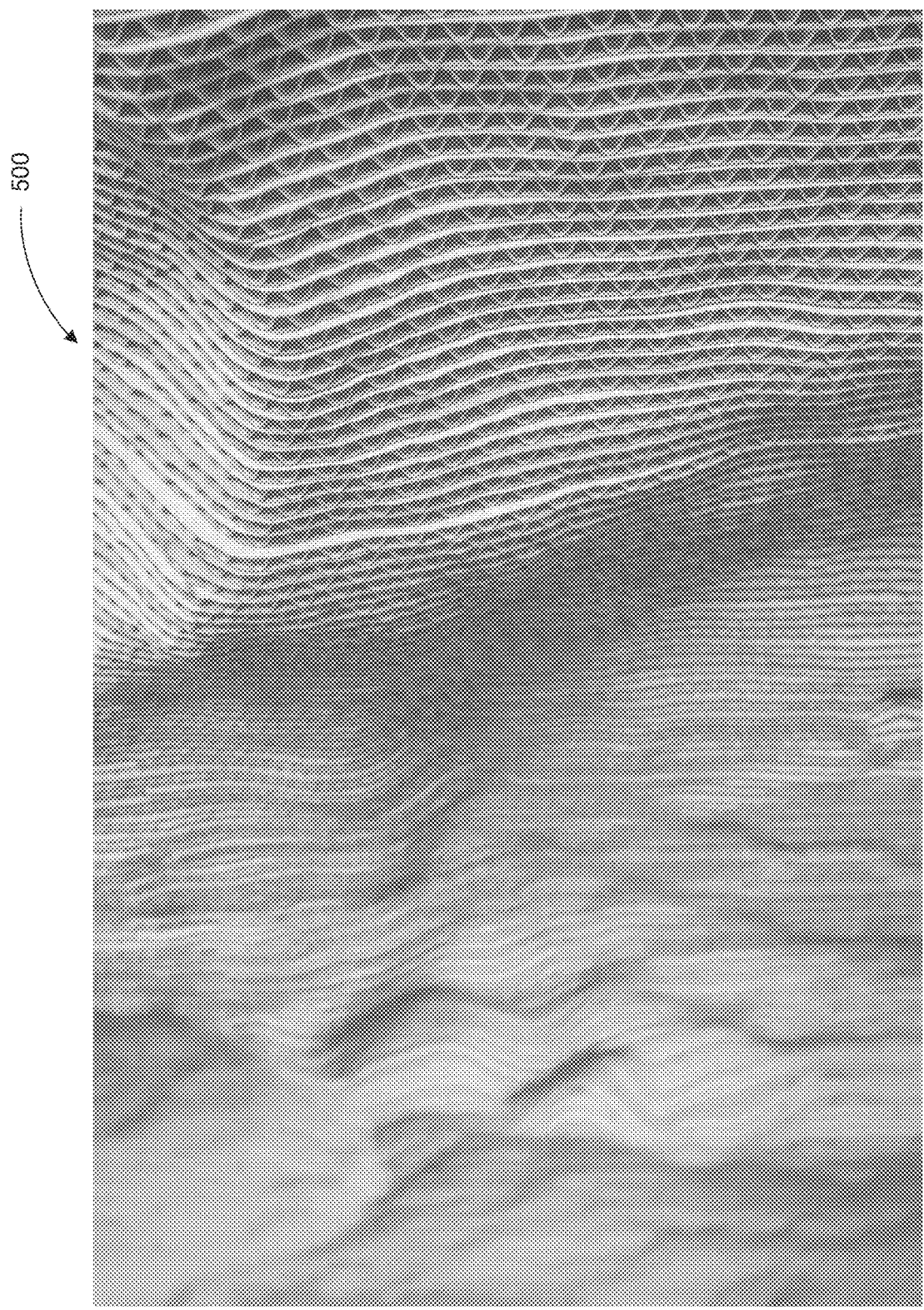
FIG. 5 provides an enlarge view of an exemplary three-dimensional construct.
Figure 6:
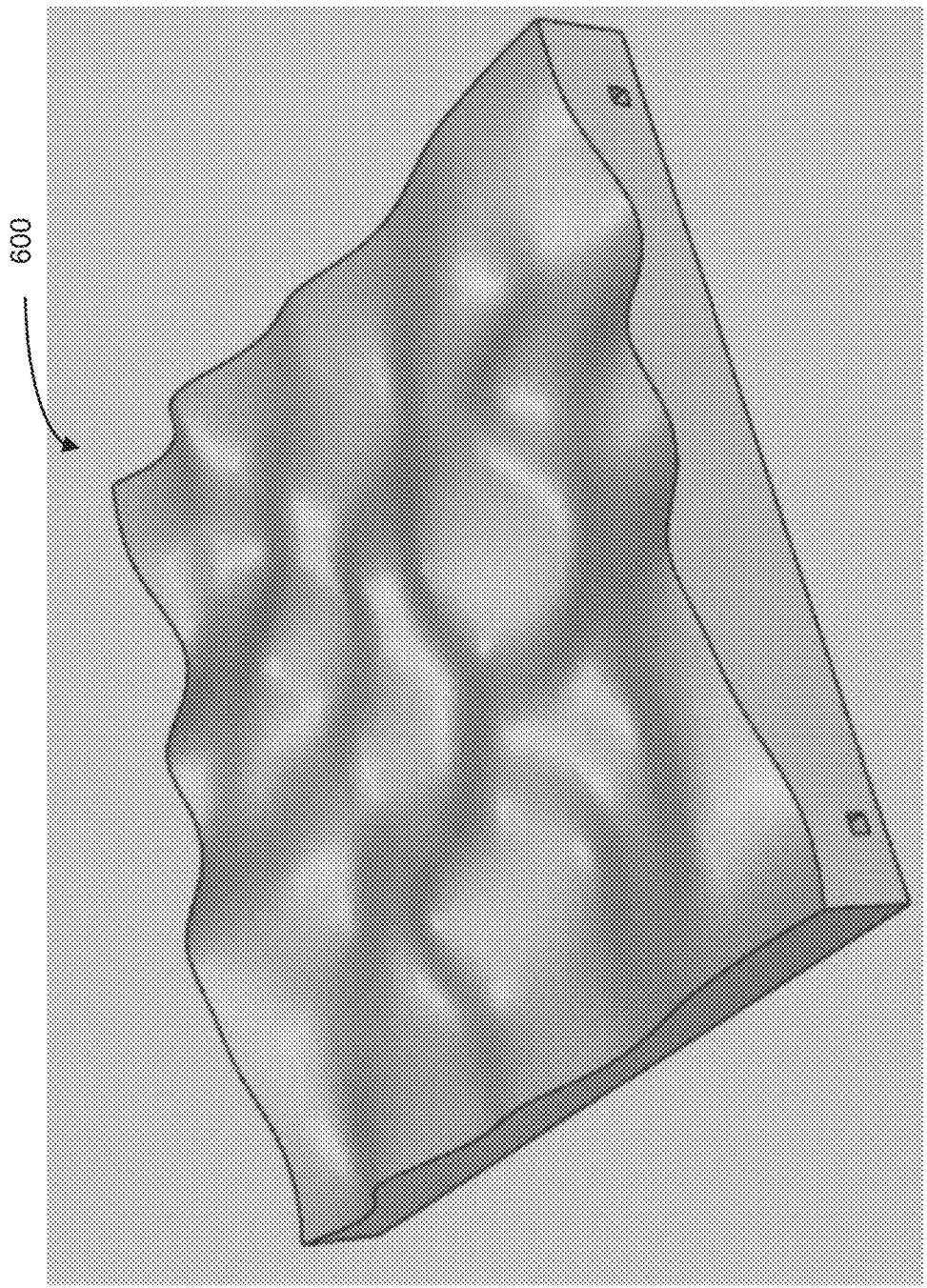
FIG. 6 shows a further view of the exemplary three-dimensional construct shown in FIG. 4.
Figure 7:
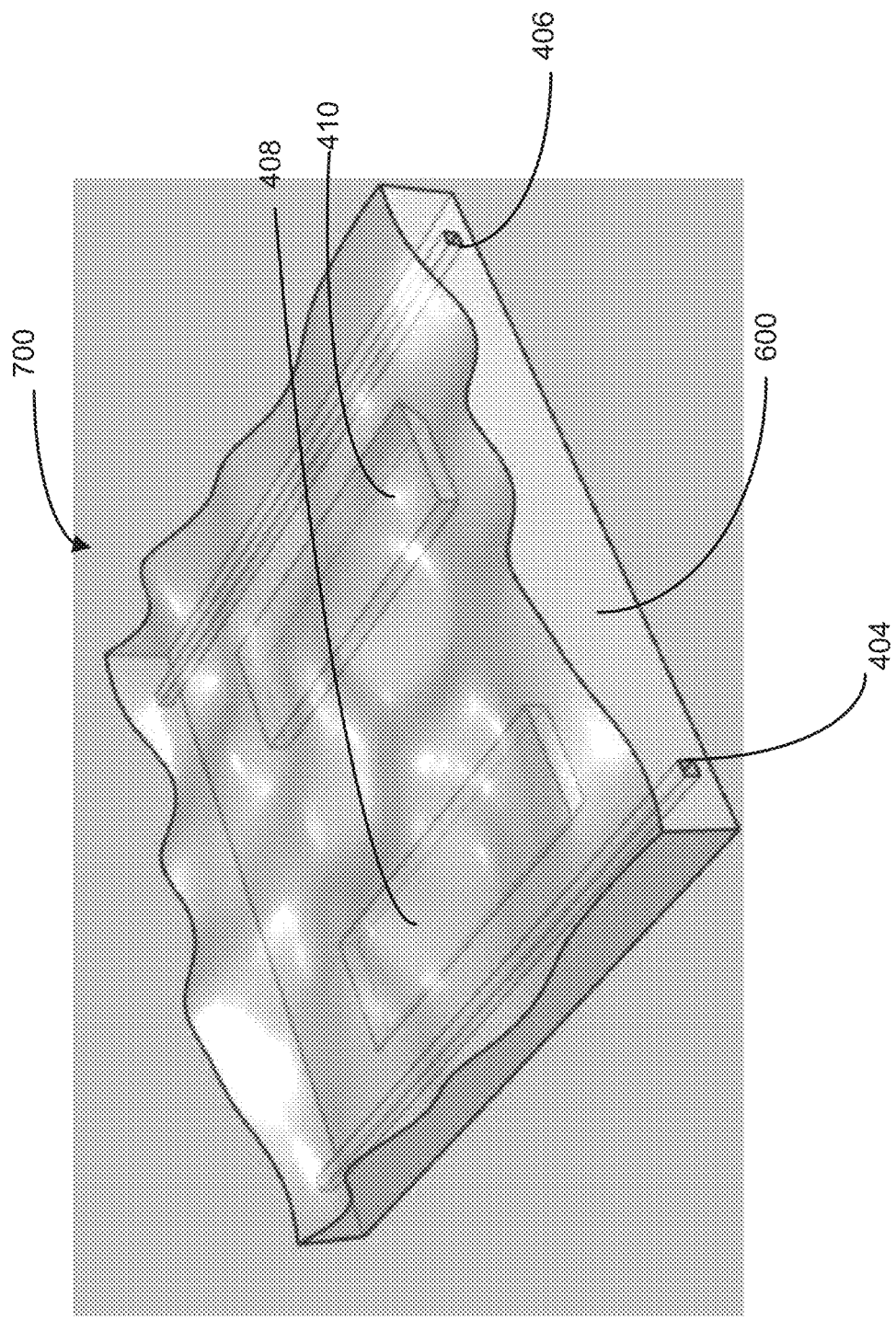
FIG. 7 shows a further view of the figure shown in FIG. 6 with the individual segments made transparent to illustrate the alignment dowels and mounting guides of the present invention.

With reference now to FIGS. 4-7, an exemplary three-dimensional construct is shown. As shown in FIG. 6, the assembled sheets are preferably glued or fixed together to create a three-dimensional construct 600 having a surface which includes a variety of three-dimensional features. FIGS. 4 and 7 provide further views 400, 700 of the three-dimensional construct 600. FIG. 4 shows the illustrates the individual segments creating the construct. In both FIGS. 4 and 7, the individual segments are transparent to illustrate the embedded alignment dowels/wires 404 and 406 which are preferably extended through the alignment holes/points 308, 310 of each cut sheet as discussed above. Still further, exemplary mounting guides 408, 410 are shown for mating with the mounting grooves 312, 314 discussed above. According to a preferred embodiment, the mounting guides 408, 410 may preferably be first attached to a wall or other surface for securing the three-dimensional construct 600. FIG. 5 further provides an enlarged view 500 of the surface of an exemplary three-dimensional construct similar to the surfaces shown in the figures above.

Figure 8:
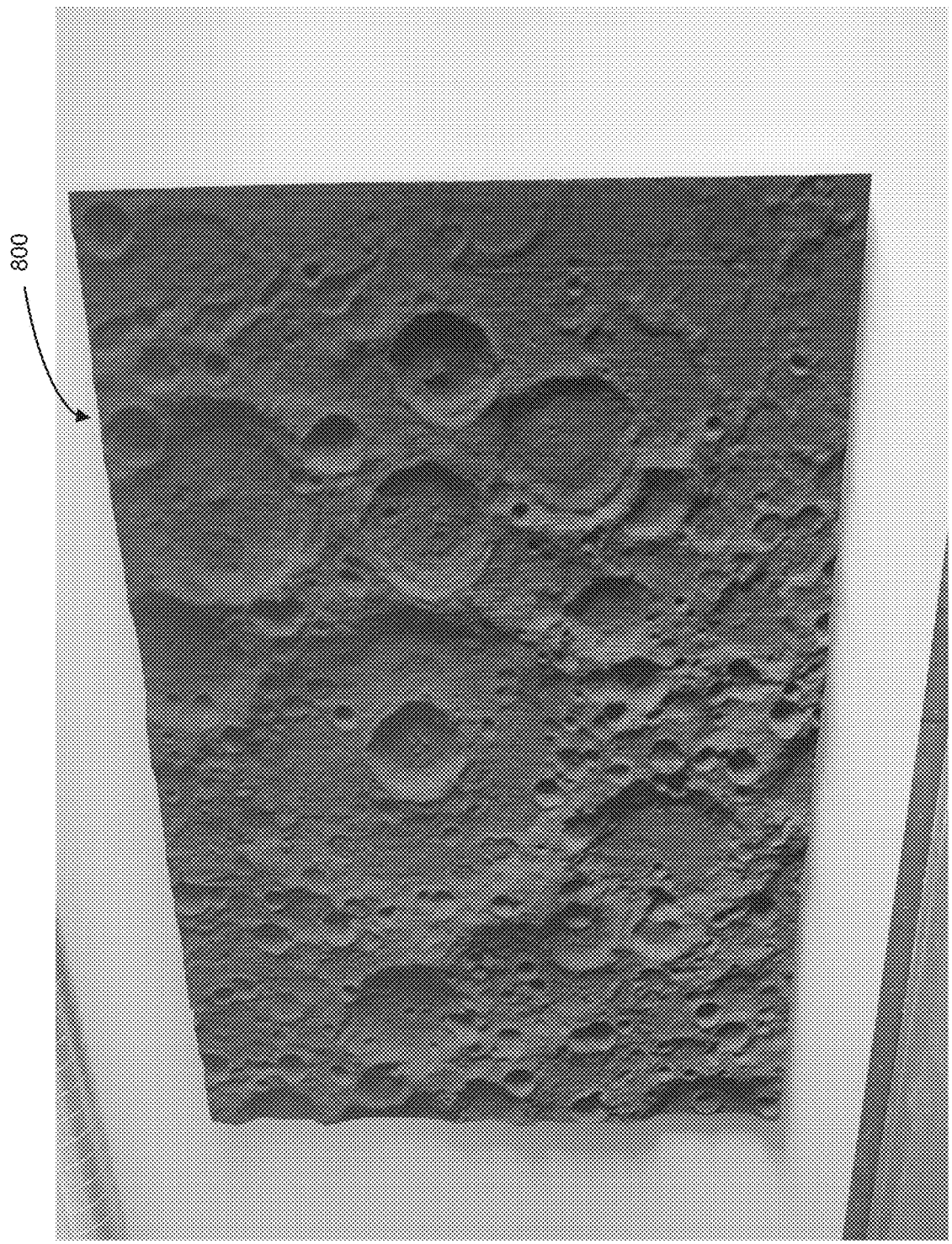
FIG. 8 shows an exemplary three-dimensional product created in accordance with the process of the present invention.

With reference now to FIG. 8, a physical example of a product of the method and apparatus of the present invention which is a topographic acoustic panel 800 made of corrugated cardboard is shown.

As show in Tables 1 and 2 below, an exemplary product produced in accordance with the present invention provides significant and surprising noise absorption results in a variety of mounting positions.

DESCRIPTION OF THE SPECIMEN TESTED

Detail of Material
 Material: Corrugated Cardboard
 Dimensions: 2.74 m (108 in.)×2.44 m (96 in.)
 Min. Thickness: 101 mm (3.976 in.)*
 Max. Thickness: 150 mm (5.906 in.)*
 Perforation Spec.: Open cell edge of c-flute corrugated cardboard
Physical Measures
 Overall Dimensions: 2.74 m (108.00 in.) wide by 2.44 m (96.00 in.) long
 Overall Thickness: 142.88 mm (5.63 in.)
 Overall Weight: 150.37 kg (331.50 lbs.)
 Area: 6.69 m$^2$ (72.00 ft$^2$)
 Mass per Unit Area: 22.46 kg/m$^2$ (4.60 lbs./ft$^2$)
Test Environment
 Volume: 292.0 m$^3$ (10,311.0 ft$^3$)
 Temperature: 23.0±0.0° C. (73.4±0.1° F.)
 Humidity: 58.6±0.7%
 Barometric Pressure: 98.3 kPa.
 *=Approximate measurement; measurement varied.

TABLE 1

MOUNTING METHOD

Type A Mounting: The test specimen was laid directly against the test surface. The perimeter was sealed using wood and metal framing. The perimeter edges were exposed, as would be typical of an actual installation of this specimen.

TEST RESULTS

| ⅓ Octave Center Frequency (Hz) | Total Absorption (SI) (m$^2$) | Total Absorption (IP) (Sabins) | Absorption Coefficient (Sabins/ft$^2$) |
| --- | --- | --- | --- |
| 100 | 1.80 | 19.38 | 0.27 |
| ** 125 | 1.59 | 17.14 | 0.24 |
| 160 | 1.26 | 13.52 | 0.19 |
| 200 | 1.64 | 17.62 | 0.24 |
| ** 250 | 2.39 | 25.77 | 0.36 |
| 315 | 4.11 | 44.20 | 0.61 |
| 400 | 4.64 | 49.93 | 0.69 |
| ** 500 | 3.81 | 41.02 | 0.57 |
| 630 | 2.82 | 30.34 | 0.42 |
| 800 | 2.09 | 22.49 | 0.31 |
| ** 1000 | 2.36 | 25.41 | 0.35 |
| 1250 | 3.58 | 38.56 | 0.54 |
| 1600 | 4.53 | 48.75 | 0.68 |
| ** 2000 | 4.02 | 43.23 | 0.60 |
| 2500 | 4.81 | 51.81 | 0.72 |
| 3150 | 5.52 | 59.38 | 0.82 |
| ** 4000 | 5.43 | 58.43 | 0.81 |
| 5000 | 5.82 | 62.62 | 0.87 |

SAA = 0.51
NRC = 0.45

TABLE 2

MOUNTING METHOD

Type K Mounting: The specimen was placed in the reverberation room in the upright position at an oblique angle to and at least 1.52 m (60 in.) from all walls.

TEST RESULTS

| ⅓ Octave Center Frequency (Hz) | Total Absorption (SI) (m$^2$) | Total Absorption (IP) (Sabins) | Absorption Coefficient (Sabins/ft$^2$) |
| --- | --- | --- | --- |
| 100 | 0.62 | 6.65 | 0.10 |
| ** 125 | 0.35 | 3.75 | 0.06 |

TABLE 2-continued

| | | | |
|---|---|---|---|
| 160 | 0.43 | 4.60 | 0.07 |
| 200 | 0.67 | 7.26 | 0.11 |
| ** 250 | 0.49 | 5.28 | 0.08 |
| 315 | 0.80 | 8.58 | 0.13 |
| 400 | 0.89 | 9.61 | 0.15 |
| ** 500 | 1.48 | 15.97 | 0.25 |
| 630 | 2.04 | 21.96 | 0.34 |
| 800 | 2.30 | 24.73 | 0.39 |
| ** 1000 | 2.32 | 24.97 | 0.39 |
| 1250 | 2.15 | 23.15 | 0.36 |
| 1600 | 2.18 | 23.49 | 0.37 |
| ** 2000 | 2.59 | 27.85 | 0.44 |
| 2500 | 2.78 | 29.94 | 0.47 |
| 3150 | 3.10 | 33.34 | 0.52 |
| ** 4000 | 3.26 | 35.11 | 0.55 |
| 5000 | 3.39 | 36.47 | 0.57 |

SAA = 0.29
NRC = 0.30

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the system and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

What is claimed is:

1. A method for creating and editing a three-dimensional model for providing dampening of vibrational reverberations and aesthetic enhancement of a space, the method comprising the steps of:
    obtaining a three-dimensional design in a computer-readable format;
    inputting a selected substrate material for a three-dimensional model construct;
    inputting a room's dimensions and acoustic characteristics of the room;
    calculating respective levels of noise reduction for a plurality of three-dimensional model constructs;
    selecting a first three-dimensional model construct;
    selecting a substrate size for the first three-dimensional model construct, wherein the size includes a length, a width and a height; wherein in the Cartesian plane, the length is parallel to the y-axis, the width is parallel to the x-axis, the height is parallel to the z-axis;
    determining the number and dimensions of model segments needed from a selected substrate for the first three-dimensional model construct;
    wherein each model segment is formed to include an upper surface conforming to a segment of a contour of the first three-dimensional construct; further wherein each model segment is formed to include a lower surface;
    further wherein a plurality of model segments are comprised of mounting grooves; wherein the mounting grooves are formed to run parallel to the length of the model construct; further wherein the mounting grooves are formed within the lower surfaces of the plurality of model segments;
    wherein a plurality of model segments are printed with a plurality of alignment points;
    sending segmenting instructions to a cutter;
    cutting the substrate into model segments each having the same length and width; wherein the model segments are cut perpendicular to the length of the first three-dimensional model construct; and
    gluing the model segments of the substrate together to create the first three-dimensional model construct.

2. The method of claim 1, wherein the step of calculating the range of product sizes and materials includes data regarding characteristics of substrate materials.

3. The method of claim 2, wherein the model segments are laser printed with an identification marking indicating its order in the later assembled construct.

4. The method of claim 3 wherein the model segments further comprise a plurality of alignment holes instead of alignment points; wherein the alignment holes are parallel to the length of the first three-dimensional construct.

5. The method of claim 2, wherein the substrate materials are comprised of cardboard.

6. The method of claim 2, wherein the substrate materials comprise materials selected from the group of materials comprising: acoustical foam, acrylic, fabric and wood.

7. The method of claim 2, wherein the acoustic characteristics include characteristics selected from the group of characteristics comprising: reverberation time, clarity, background noise and the speech transmission index.

8. A method for creating and editing a three-dimensional model for providing dampening of vibrational reverberations for the purpose of aesthetic enhancement of a space, the method comprising the steps of:
    obtaining a three-dimensional design in a computer-readable format;
    inputting a room's dimensions and acoustic reverberation data of the room into a computer to determine the final dimensions of a three-dimensional model construct;
    calculating a range of product sizes and materials based on target acoustical characteristics;
    determining the number and dimensions of segments of a selected substrate required for the three-dimensional model construct;
    segmenting the three-dimensional model construct via computer script into slices corresponding to the number of sheets of cardboard that will comprise the final product;
    sending the instructions for the three-dimensional model slices to a laser cutter;
    laser cutting each segment of the selected substrate into sheets; and
    gluing the selected substrate sheets in order to create the three-dimensional model construct.

9. A product formed by a process of creating and editing a three-dimensional model for providing dampening of vibrational reverberations and aesthetic enhancement of a space, the method comprising the steps of:

obtaining a three-dimensional design in a computer-readable format;

inputting a selected substrate material for a three-dimensional model construct;

inputting a room's dimensions and acoustic characteristics of the room;

calculating respective levels of noise reduction for a plurality of three-dimensional model constructs;

selecting a first three-dimensional model construct;

selecting a substrate size for the first three-dimensional model construct, wherein the size includes a length, a width and a height; wherein in the Cartesian plane, the length is parallel to the y-axis, the width is parallel to the x-axis, the height is parallel to the z-axis;

determining the number and dimensions of model segments needed from a selected substrate for the first three-dimensional model construct;

wherein each model segment is formed to include an upper surface conforming to a segment of a contour of the first three-dimensional construct; further wherein each model segment is formed to include a lower surface;

further wherein a plurality of model segments are comprised of mounting grooves; wherein the mounting grooves are formed to run parallel to the length of the model construct; further wherein the mounting grooves are formed within the lower surfaces of the plurality of model segments;

wherein a plurality of model segments are printed with a plurality of alignment points;

sending segmenting instructions to a cutter;

cutting the substrate into model segments each having the same length and width; wherein the model segments are cut perpendicular to the length of the first three-dimensional model construct; and gluing the model segments of the substrate together to create the first three-dimensional model construct.

10. The product of claim 9, wherein the step of calculating the range of product sizes and materials includes data regarding characteristics of substrate materials.

11. The product of claim 10, wherein the model segments are laser printed with an identification marking indicating its order in the later assembled construct.

12. The product of claim 11, wherein the model segments further comprise a plurality of alignment holes instead of alignment point; wherein the alignment holes are parallel to the length of the first three-dimensional construct.

13. The product of claim 10, wherein the substrate materials are comprised of cardboard.

14. The product of claim 10, wherein the substrate materials comprise materials selected from the group of materials comprising: acoustical foam, acrylic, fabric and wood.

15. The product of claim 10, wherein the acoustic characteristics include characteristics selected from the group of characteristics comprising: reverberation time, clarity, background noise and the speech transmission index.

* * * * *